Patented Aug. 2, 1949

2,477,671

UNITED STATES PATENT OFFICE 2,477,671

PURIFICATION OF ALKYLATION MIXTURES

Dick M. Warburton, Painesville, Ohio, assignor to Diamond Alkali Company, Cleveland, Ohio, a corporation of Delaware No Drawing. Application November 29, 1944, Serial No. 565,807

5 Claims. (Cl. 210—42.5)

This invention relates to the purification art and more particularly relates to a method of improving Friedel-Crafts reaction liquors through the removal therefrom of catalyst complexes.

In Friedel-Crafts synthesis there is produced an organo-metal halide complex composition which exists in the reaction medium as a liquid and is in large part associated with the sludge common to such reaction mixtures. To a lesser extent, this complex substance is dispersed as a liquid throughout the reaction medium and to a still lesser degree is dissolved in that medium. Because it is an undesirable contaminant even in very small quantities and because of its rather thorough dispersion through such reaction mixtures and its appreciable solubility therein, there has long existed a serious problem of economically accomplishing separation of it from such mixtures and purification of Friedel-Crafts reaction products. In mixtures of very low molecular weight and low boiling range materials, or of relatively high molecular weight and high boiling range materials, the separation problem was early quickly disposed of through the application of physical means and does not now exist. As an example of the former, in which the mixture was comprised of methyl chloride and benzene, distillation produced the desired result easily and efficiently. As an example of the latter case, wherein the mixture was comprised of chlorinated paraffin wax and a phenolic body, suitable purification was desirably effected through a decantation operation. But in the intermediate zone, that is, where the components of the reaction mixture have molecular weights and boiling ranges between the extremes above-mentioned, distillation and decantation have not been found to produce the desired result.

There have been many attempts by prior investigators to develop suitable methods for purifying the products of such mixtures which, incidently, comprise the great proportion of all Friedel-Crafts reaction products. These efforts have not resulted in the development of any satisfactory purification procedure. The reason for this failure lies in the fact that because it was believed impossible to effect purification by other than chemical means, no prior investigator resorted to physical means, which, as clearly demonstrated by my invention, are highly effective and far superior to anything heretofore known in the art.

The process of my invention is based on my discovery that although the liquid organo-metal halide complex of a Friedel-Crafts reaction is in part dissolved in and in part dispersed in the form of fine liquid particles throughout the liquid reaction medium, it can be separated from said liquid medium to produce a purified Friedel-Crafts reaction product through the employment of physical means alone.

Briefly, the method of my invention comprises the step of bringing a Friedel-Crafts reaction liquor containing Friedel-Crafts catalyst complex into contact with a solid substance having adsorptive capacity.

Although in its simplest form the invention comprises the single step above-described, it is my preference in the practice of it to contact said reaction liquor with the solid and then, after a sufficient time for adsorption of the organo-metal halide complex by said solid, separate the reaction liquor from the catalyst-impregnated solid. This is readily accomplished in several ways. The reaction liquor may, for example, be passed through a funnel lined with adsorptive paper, such as the ordinary analytical grade filter paper. This operation actually involves two steps; namely, that of introducing the liquor into the vessel and effecting removal of it therefrom; but since gravity acts to effect such removal, only one motion is required of the operator. On the other hand the reaction liquor may, for instance, be brought on to a bed of coarse material such as co-precipitated alumina-silica particles of the type commonly employed in crude oil cracking operations, and then, after a suitable time during which adsorption takes place, the reaction liquor may be withdrawn from contact with the adsorptive bed. While both these procedures are considered suitable, in practice I prefer the latter.

Another alternative procedure which may be found desirable under certain circumstances comprises the steps of introducing into the catalyst complex-contaminated reaction liquor an amount of adsorptive substance, preferably in finely divided form, and then, through filtration or decantation, separating the solid and liquid phases. In the event that this practice is followed, the choice of the adsorptive material employed may be important to the efficient operation of the process. A very dense substance which quickly settles to the bottom of the liquor giving little adsorptive effect would not be desirable nor, on the other hand, would a very light solid such as filter paper which remains on the surface of the liquor to give little adsorptive effect.

Depending on the quantity of the reaction liquor, the extent of contamination of the liquor undergoing treatment, the adsorptive capacity of the solid, the amount of the solid employed, and the length of the adsorption period, the Friedel-Crafts reaction product will be of high, low or intermediate purity. Through manipulation of these variables and adjustment of the conditions attending the treatment of the reaction liquor, an alkylation product of practically any desired quality can be produced. By way of example, for purposes of illustration of my invention and not by way of limiting the appended claims, I have prepared a substantially clear and catalyst complex-free Friedel-Crafts reaction product of chlorinated kerosene and benzene in the following manner: Within ten minutes after discontinuing agitation of the reaction mass, after the final cooling step of the Friedel-Crafts process, a liter of said mass, which was of a very dark brownish color, was passed through an open-ended vessel packed with about 45 grams of 20 mesh co-precipitated silica-alumina particles. The effluent liquid which issued in a steady stream in good volume from the lower end of the packed vessel was water-white and of much higher purity than another portion of the same reaction mass which was stagnated for several hours and was then decanted to separate the sludge and solids from the still deeply colored supernatant liquid.

Into a similar open-ended vessel packed with 35 grams of finely cut filter paper, another liter of the freshly prepared, unstagnated reaction mass was passed; and, as in the above operation, there was obtained at a good rate of flow from the lower end of the packed vessel, a high purity, clear liquid.

Again, I obtained the same result, i. e. a water-white liquid substantially free from catalyst complex, by passing 500 cc. of the freshly prepared and unstagnated reaction mass into a glass funnel lined with a 13-inch diameter filter paper weighing 6.6 grams. Here, as above, the flow of liquid through the treating vessel was reasonably rapid, the 500 cc. mass being purified and clarified and recovered from the filter vessel within about five minutes.

In addition to the aforementioned co-precipitated alumina-silica and filter paper, wood sawdust, charcoal, activated charcoal, coke, silica gel, and similar porous solids including unglazed, fibrous, cellulosic materials and cotton, woolen and like fabrics are suitable for use singly or in combination as adsorbents in this process. I prefer for this purpose, however, the alumina-silica composition which is generally employed in the petroleum industry as a cracking catalyst because it is relatively inexpensive and highly effective in adsorbing catalyst complex and is readily regenerated for reuse. This regeneration I have accomplished and obtained in the alumina-silica in its original catalyst complex adsorption capacity by rinsing it several times with water containing an alkyl aryl sulfonate detergent and finishing with a water rinse to remove residual detergent.

Having thus described the present invention so that others skilled in the art may be able to understand and practice the same, I state that what I desire to secure by Letters Patent is defined in what is claimed.

What is claimed is:

1. The method of purifying a Friedel-Crafts reaction liquor containing in dispersion Friedel-Crafts organo-metal halide complex which comprises the steps of dispersing in said liquor solid particles having adsorptive capacity and thereafter separating said particles from the liquor, washing said particles with alkyl aryl sulfonate detergent solution and redispersing said washed particles in further impure Friedel-Crafts reaction liquor.

2. The method of clarifying and purifying a Friedel-Crafts reaction liquor containing in dispersion and solution Friedel-Crafts organo-metal halide complex which comprises the steps of flowing said liquor through a bed comprising co-precipitated silica-alumina particles and collecting the effluent from said bed, discontinuing flow of said liquor through said bed and flowing alkyl aryl sulfonate detergent dissolved in water through the bed thereby regenerating the adsorptive capacity of said silica-alumina particles, rinsing the bed with water to remove substantially all the residual detergent substance, and again flowing said Friedel-Crafts liquor containing catalyst complex through said bed.

3. The continuous method of purifying and clarifying Friedel-Crafts reaction liquor, particularly to remove therefrom Friedel-Crafts metallo-organic intermediates, which includes the steps of contacting Friedel-Crafts reaction mixture with co-precipitated silica-alumina particles, separating said co-precipitated silica-alumina from said Friedel-Crafts liquor, contacting said silica-alumina with a solution of alkyl aryl sulfonate detergent, removing said silica-alumina particles from said detergent solution, and contacting said silica-alumina particles with further crude Friedel-Crafts mixture.

4. The method of purifying a Friedel-Crafts reaction liquor containing dissolved and dispersed Friedel-Crafts organo-metal halide complex, which comprises the steps of bringing said reaction liquor into contact with a body of porous co-precipitated silica-alumina particles, adsorbing said organo-metal halide complex thereon, and separating purified reaction liquor from said body of co-precipitated silica-alumina particles.

5. The method of purifying a Friedel-Crafts reaction liquor containing dissolved and dispersed Friedel-Crafts organo-metal halide complex, which comprises the steps of passing said liquor through a bed of porous co-precipitated silica-alumina particles, adsorbing said organo-metal halide complex thereon, and collecting the purified liquor.

DICK M. WARBURTON.

REFERENCES CITED

The following references are of record in the file of this patent:

UNITED STATES PATENTS

| Number | Name | Date |
|---|---|---|
| 336,799 | Derham | Feb. 23, 1886 |
| 345,174 | Porter | July 6, 1886 |
| 680,290 | Thomas | Aug. 13, 1901 |
| 956,832 | Seitz | May 3, 1910 |
| 962,841 | Hood et al. | June 28, 1910 |
| 1,072,034 | Richter et al. | Sept. 2, 1913 |
| 1,072,035 | Richter et al. | Sept. 2, 1913 |
| 1,571,648 | Schmidt | Feb. 2, 1926 |
| 1,722,871 | Weber et al. | July 30, 1929 |
| 2,059,552 | Churchill | Nov. 3, 1936 |
| 2,155,704 | Goodall et al. | Apr. 25, 1939 |
| 2,233,093 | Carman et al. | Feb. 25, 1941 |
| 2,248,131 | Smith | July 8, 1941 |
| 2,294,697 | Seip | Sept. 1, 1942 |
| 2,305,657 | Aehnelt | Dec. 22, 1942 |
| 2,316,499 | Borglin | Apr. 13, 1943 |
| 2,339,386 | Edwards | Jan. 18, 1944 |
| 2,398,284 | Briggs | Apr. 9, 1946 |

FOREIGN PATENTS

| Number | Country | Date |
|---|---|---|
| 45,358 | France | May 6, 1935 |
| (5th addition to No. 711,858) | | |
| 451,202 | Great Britain | July 31, 1936 |